April 16, 1940.  J. A. CURTIS  2,197,450

PIPE COUPLING

Filed Jan. 29, 1937  4 Sheets-Sheet 1

INVENTOR
John A. Curtis
BY
Louis Prevost Whitaker
ATTORNEY

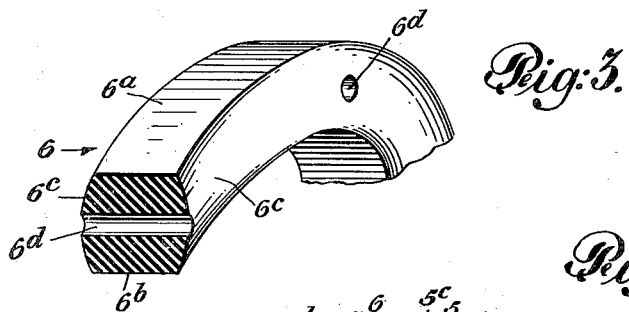
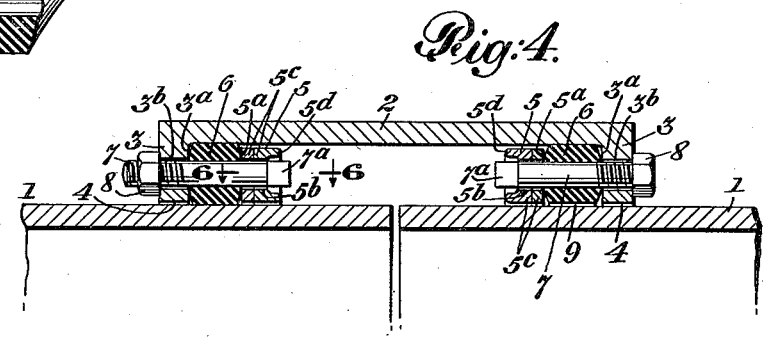
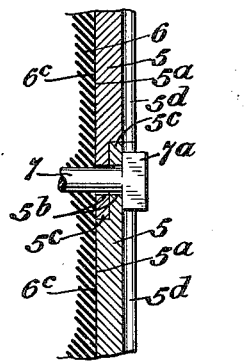
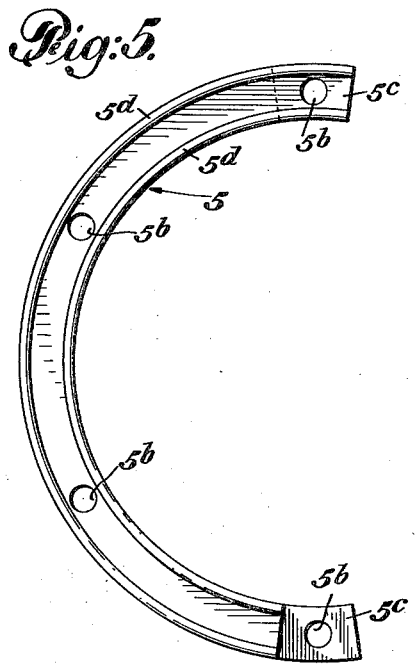

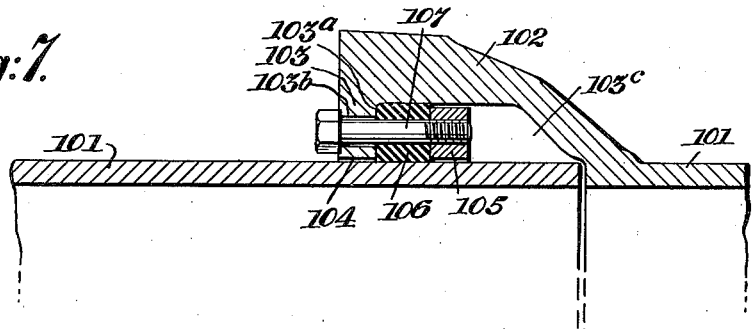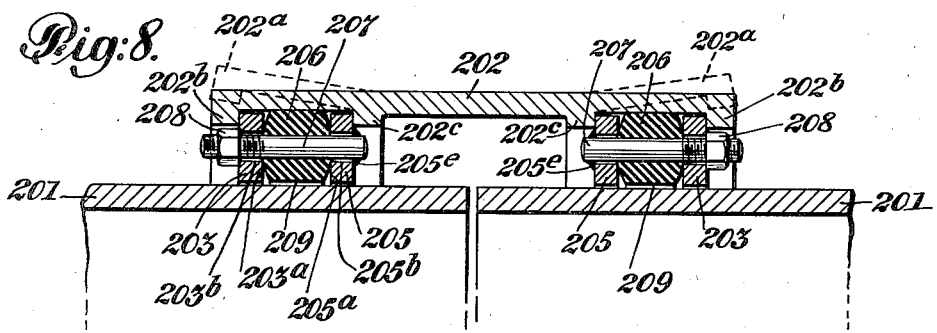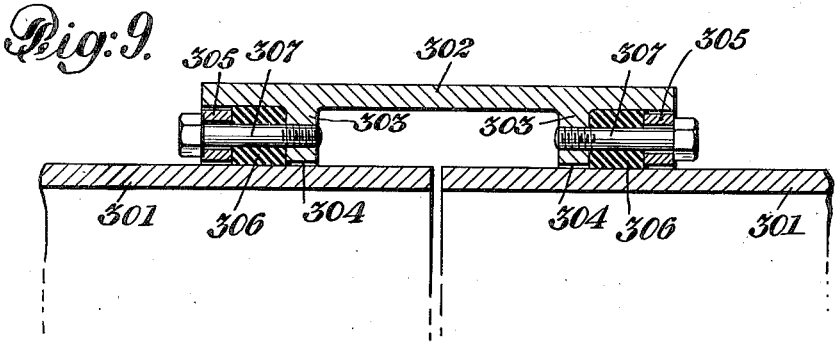

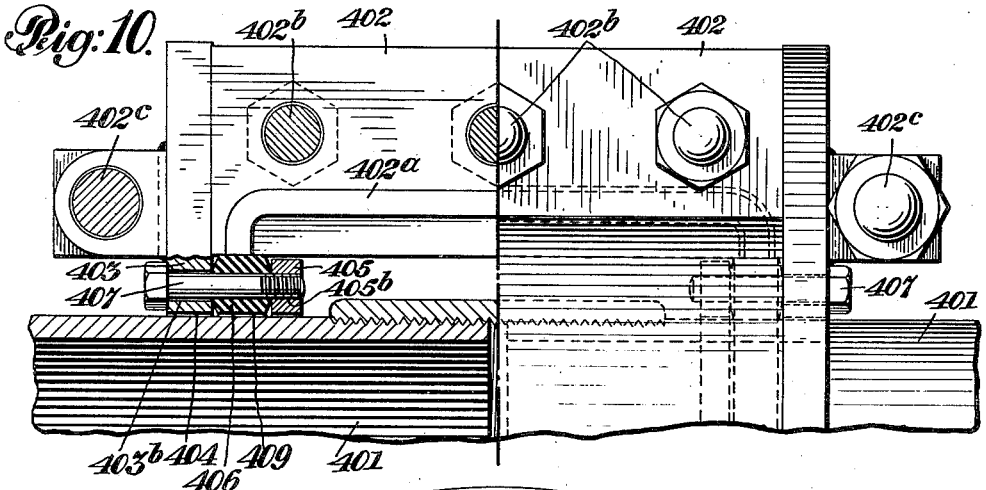
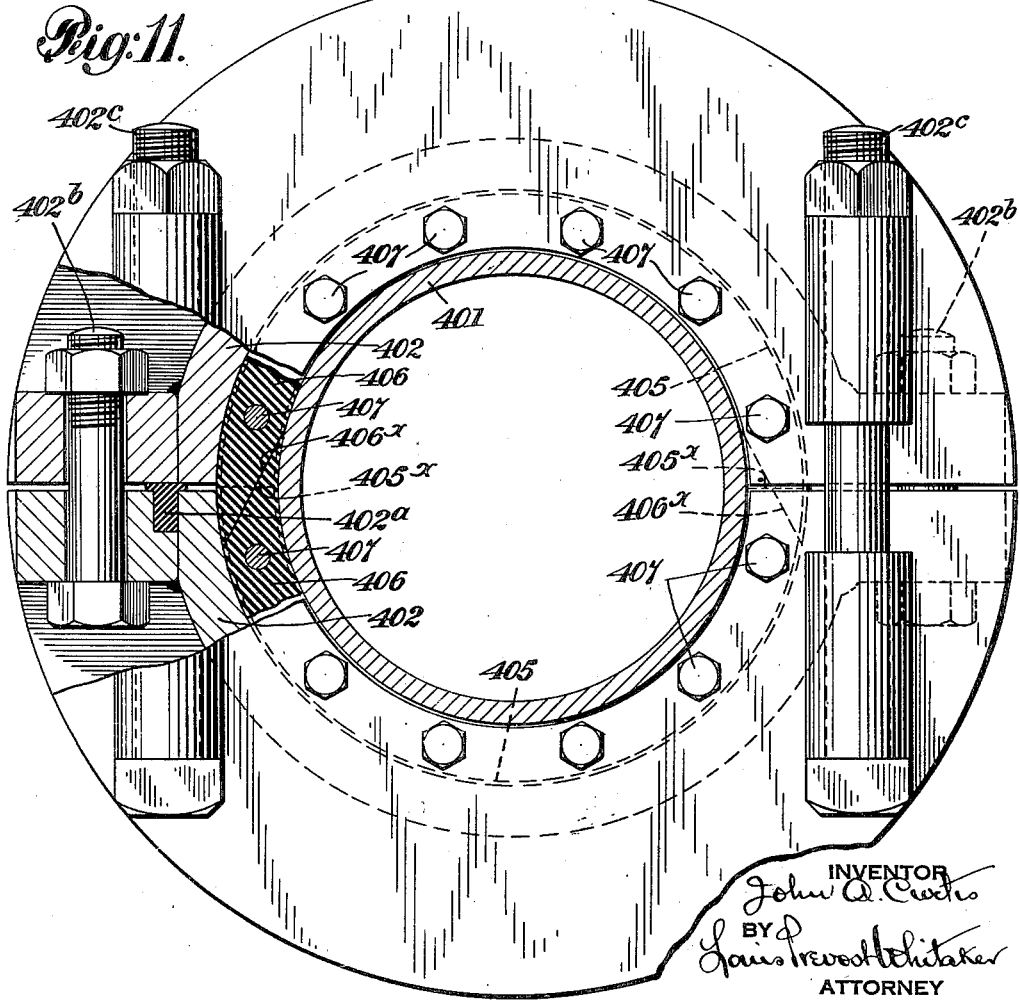

Patented Apr. 16, 1940

2,197,450

UNITED STATES PATENT OFFICE 2,197,450

PIPE COUPLING

John A. Curtis, Bradford, Pa., assignor, by mesne assignments, to Dresser Manufacturing Company, Bradford, Pa., a corporation of Pennsylvania Application January 29, 1937, Serial No. 122,951

8 Claims. (Cl. 285—196)

My invention consists in the novel features hereinafter described, reference being made to the accompanying drawings, which show several embodiments of my invention, selected by me for the purpose of illustration, and my invention is fully disclosed in the following specification and claims.

My invention relates to rubber packed pipe couplings for pipe sections having plain or unthreaded ends. Such couplings as generally constructed, ordinarily comprise a sleeve or middle ring as it is usually termed, provided at each end with a packing recess, packing rings for engaging said recesses, a pair of metal followers or clamping rings for engaging the packings and forcing them into engagement with the pipe sections and the packing recesses in the middle ring, and bolts for drawing the clamping rings toward the middle ring. These bolts may be a series of short bolts at each end of the coupling connecting one of the clamping rings with an outwardly projecting flange of the middle ring or more commonly a single series of through bolts extending from one clamping ring to the other. In either case, it is necessary that the clamping rings shall have portions extending considerably outside of the periphery of the packing recesses and provided with bolt holes, and where through bolts are employed the series of bolt holes in the clamping rings must be outside the circle of the flared ends of the middle ring. In these constructions, the bolt strain is exerted at a considerable distance radially from the outer surfaces of the pipe sections and imposes a severe turning moment to the clamping ring which must be made strong enough to resist it. Furthermore, the parts of the coupling must usually be separately placed in position in making a joint and the entire coupling is necessarily very considerably larger in exterior diameter than the pipe sections.

One object of my present invention is to provide a satisfactory pipe coupling in which a sleeve member is provided with an integral inwardly extending flange having a flat or plane inner face substantially perpendicular to the axis of the coupling, a sectional follower located entirely within said sleeve member and also provided with a substantially perpendicular flat or plane packing engaging face, a packing ring interposed between said faces of the flange and follower and having outwardly and oppositely curved or convex faces and an inner face of slightly greater diameter than the enclosed plain end pipe section and a circular series of threaded clamping devices extending through the follower, the packing ring and the sleeve flange for connecting said parts prior to assembling them on the pipe section and bringing said flat or plane faces into engagement with the curved or convex faces of the packing ring.

I prefer to employ for this purpose cap screws having their polygonal heads engaging the outer face of the inwardly extending flange of the sleeve member and their threaded portions engaging threaded apertures in the follower but I may use bolts and nuts, if desired, in which case the nuts will ordinarily engage the outer face of the sleeve flange and means will be provided to prevent the bolts from turning.

This construction will be duplicated at opposite ends of a middle ring in case of an ordinary coupling or repair sleeve, but the invention is equally applicable to a coupling of the bell and spigot type and possesses the advantages hereinafter fully described, one of which is the ability to assemble the parts previous to placing the sleeve portion around the plain end of the adjacent pipe section so that all the operator has to do is to insert plain end of a pipe section within the coupling and tighten the bolts. In some instances, I may employ followers on opposite sides of the packing ring and connect them by bolts passing through both followers and through the packing ring and secure this assembly within the sleeve member against material movement longitudinally thereof and where it is desired to employ integral followers the sleeve member may be formed normally so as to permit the insertion of the followers and thereafter upset so as to permanently enclose them.

In some instances, the inwardly extending flange of the sleeve member may be set back from the end of the flange far enough to accommodate the packing ring and follower, in which case also the follower may be made in one piece, but this is not my preferred construction as the interior pressure maintained within the pipe line is not transmitted to the packing ring as it is in the other constructions mentioned.

Other features of my invention and slight modifications thereof are referred to in the following description and claims.

Referring to the accompanying drawings:

Figure 3 is an elevation, partly in section, of a portion of one of the packing rings.

Figure 4 is a partial sectional view of a slight modification of a coupling similar to that shown in Figure 1 in which bolts and nuts are employed in connection with sectional followers having overlapping ends, and means for holding the bolts from turning.

Figure 5 is an elevation of one section of the follower shown in Figure 4.

Figure 6 is a detail sectional view on the line 6—6 of Figure 4, showing the overlapping portions of the sections of a follower.

Figure 7 is a partial sectional view of a bell and spigot type of coupling showing my invention applied thereto.

Figure 8 is a partial sectional view of a slightly modified form of my invention embodied in a coupling for the meeting ends of plain end pipe.

Figure 9 is a view similar to Figure 8 showing another slight modification of my invention.

Figure 10 is a partial view partly in section of a repair sleeve showing my invention applied thereto.

Figure 11 is an end view of the repair sleeve shown in Figure 10, partly broken away and parts including one of the enclosed pipe sections, being shown in section.

Figure 1:
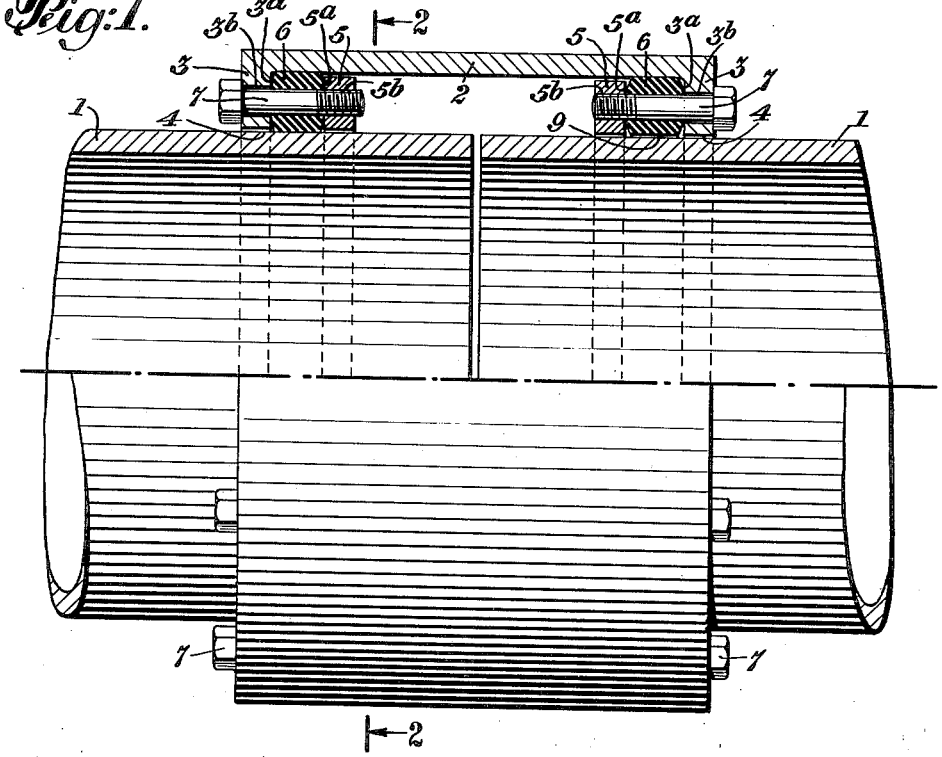
Figure 1 represents an elevation, partly in section, of a coupling for the adjacent ends of two plain end pipe sections, showing the cap screws tightened at the lefthand end of the coupling and the parts as they appear before the screws are tightened at the other end thereof.
Figure 2:
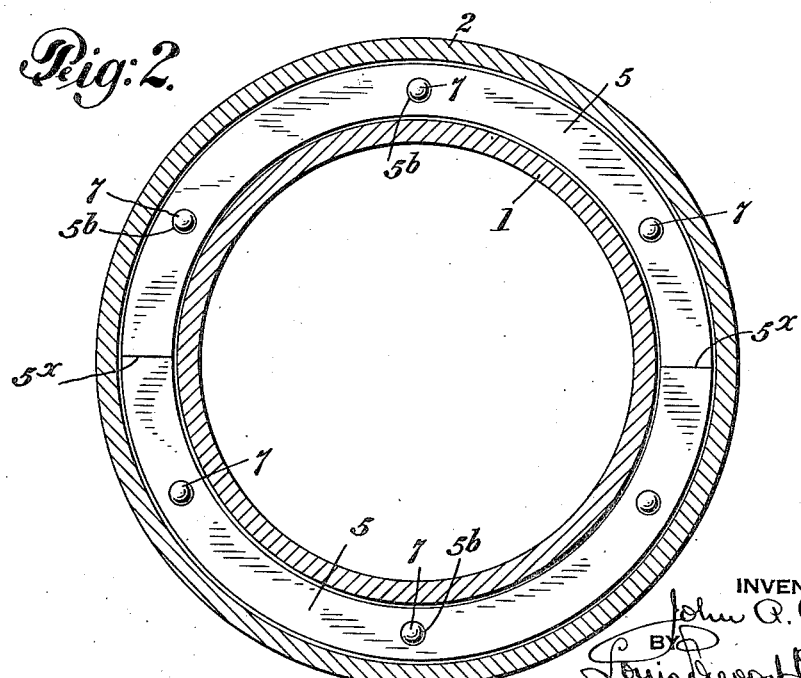
Figure 2 represents a section of Figure 1 on the line 2—2, looking in the direction of the arrows.

Referring to the embodiment of my invention illustrated in Figures 1–3, inclusive, 1, 1, represent the meeting ends of two adjacent plain end pipe sections which are to be coupled together. 2, represents a coupling sleeve which is of appreciably greater diameter than the pipe sections 1, and is provided at each end with an integral inwardly extending flange 3, the inner edge of which forms a pipe aperture 4. The flanges 3, are each provided with a plane inner packing engaging face 3a, substantially perpendicular to the axis of the coupling and each flange 3 is also provided with a circular series of bolt holes as indicated at 3b, Fig. 1. 5, 5, represent clamping rings or followers which are located within the sleeve 2 and are preferably made in sections as indicated in Figure 2. As therein shown, each follower is made in two sections with abutting ends as indicated at 5x. Each follower is provided in this instance with a series of threaded apertures 5b, registering with the bolt holes in the adjacent end flange 3 of the sleeve 2, and so arranged that the meeting ends at 5x of the follower sections will lie between adjacent apertures 5b as clearly shown in Fig. 2. The follower is made sufficiently strong in cross section to withstand the load of the gasket under stress of the bolts without deformation, even where the sections are not lapped, or secured to each other. Furthermore, the pressure within the line acts directly on the inner face of the follower, increasing the load on the gasket and supporting the follower uniformly by the fluid-pressure which precludes any possibility of injury or deformation of the follower no matter how highly the gasket may be compressed. Each follower has a plane packing engaging face 5a, substantially perpendicular to the axis of the coupling and opposed to one of the faces 3a of the sleeve previously referred to. The opposite face of each follower is preferably also formed as a plane face.

6, 6, represent the packing rings of the coupling, a portion of one of which is shown in detail in Figure 3. These rings are formed preferably of solid rubber or rubber composition molded in ring form, although they might be made in the form of a strip provided with bevelled overlapping edges and folded into ring form when they are placed in position in the coupling if this were found to be desirable. As best shown in Figure 3, each of the packing rings 6, is provided with a cylindrical exterior surface 6a, to engage the inner cylindrical face of the sleeve 2, an inner cylindrical face 6b, the diameter of which is slightly greater than the exterior diameter of the pipe sections as shown at the right in Figure 1, and each packing ring is also provided with inner and outer annular faces 6c, which are curved outwardly so as to form opposite convex annular faces to engage respectively the plane inner faces 3a and 5a, of the sleeve flanges and followers. Each packing ring is also provided with a circular series of apertures 6d, adapted to register with the bolt holes in the end flanges 3 and followers 5.

At each end of the sleeve 2, I provide a circular series of comparatively short cap screws 7, for connecting one of the followers 5 with the adjacent end flange 3 of the sleeve 2. Each of these cap screws is preferably provided with a polygonal head, to engage the outer faces of the end flanges 3, and threaded portions to engage the threaded apertures in the followers. The bolts extend through the registering apertures in each flange 3 in the adjacent packing ring 6 and adjacent follower 5, as clearly shown in Figure 1.

As will be seen, this construction permits the entire coupling to be assembled independently of the pipe sections with which it is to be used, and to be conveyed to the point of use in the field in assembled relation which saves time in the field and prevents the various parts of the coupling from becoming accidentally separated. It also avoids the loss of time in getting together the required parts for each coupling in the field at the point of use and the necessity of assembling them at the time the joint is made. In Figure 1, the relation of the parts at the righthand end of the sleeve 2, is that in which they are originally assembled before the bolts are tightened up, and it will be readily seen that the entire coupling as a unit can be slipped over the adjacent ends of the pipe sections to be connected so that the operator has only to tighten the cap screws at the opposite ends of the sleeve. The interior diameter of the packing rings when in uncompressed condition being slightly greater than the exterior diameter of the pipe sections, the resulting clearance which is indicated at 9 in Figure 1, will facilitate the placing of the coupling around the meeting pipe sections before the cap screws are turned up.

When the cap screws are tightened, the oppositely convex faces 6c of each of the packing rings will be engaged substantially centrally thereof by the plane faces 5a and 3a, of the adjacent follower 5, and end flange 3, and the force thus exerted on the packing rings will immediately force the inner face 6b of the packing ring into sealing contact with the exterior of the pipe section 1 which the packing ring surrounds, as will be readily understood, and this sealing action takes place before the packing rings are sufficiently distorted to bring the outer portions of the opposite convex faces into complete engagement with the perpendicular faces 3a and 5a. As is well known, rubber partakes of the characteristics of both a liquid and a solid. Like a liquid, it is substantially incompressible, while like certain solids it may be distorted and thereby internal stresses are set up which tend to restore it to its original form. By forming the rubber packing ring with the opposite convex faces and subjecting it to compressing force between the plane faces of the followers and integral end flanges of the sleeve, a greater proportion of the force of the clamping bolts is applied to the packing rings for the purpose of bringing the inner faces into sealing engagement with the pipe sections so that by the time the remaining portions of the convex faces are brought into contact with all or substantially all of the remaining portions of said plane faces as shown at the lefthand end of the sleeve 2 in Figure 1, and also in Figure 5, such internal stress has been set up within the body of the packing ring that there is comparatively little tendency for the rubber to cold flow into the clearances between the pipe sections and the surrounding faces of the followers 5 and end flanges 3, and between the exterior peripheries of the followers and the inner faces of the sleeve 2. If sufficient tension is applied to the packing rings they may assume a substantially rectangular cross section, but even so, there is little or no tendency for the rubber to cold flow into the adjacent clearances which would tend to reduce the sealing effect of the packing ring. This construction, therefore, enables me to secure the desired sealing effect of the packing rings with less bolt strain than would be necessary if the packing rings were made of rectangular cross section and I am, therefore, able to use cap screws (or bolts) of smaller diameter than would otherwise be necessary while securing a perfectly satisfactory gas tight seal between the coupling sleeve and the pipe sections. It will also be seen that as the central interior portion of the sleeve 2 is in communication with the interior of the pipe sections the pressure of the fluid passing through the pipe line will be exerted on the inner faces of the followers 5, 5, and will be transmitted to the packing rings 6, so that the interior pressure of the fluid in the pipe line tends to assist the bolts in keeping the joint tight.

In this connection it may be noted, that the formation of the end flanges 3 at each end of the coupling sleeve integral with the sleeve, prevents the possibility of either of the packing rings being pushed out of the sleeve either by the internal pressure in the line, or by the endwise movement of a pipe section with respect to the coupling. I am aware of the fact that it has been proposed to provide a sleeve having one integral end flange and a detachable flange at the other end either entirely unconnected with the sleeve or connected therewith by small screws which is an uncommercial construction and was no doubt suggested for the purpose of enabling the interior followers and packing rings to be assembled at the time of making the joint. By my improved construction, however, the end flanges of the sleeve may both be made integral as the rubber packing rings and the sectional followers can, as previously stated, be inserted in the sleeve, the bolts passed through the followers, packing rings, and adjacent end flanges, and the nuts applied so as to hold the entire coupling in assembled relation previous to the application to the pipe sections.

While I prefer to use cap screws 7 engaging threaded apertures in the follower on account of their convenience in assembling the parts, I wish it to be understood that I may employ bolts or nuts, if desired, as indicated in Figures 4, 5 and 6, of the drawings. In these figures, I have shown as the screw threaded clamping means, two circular series of bolts 7, having means for preventing them from turning, which consists in this instance, of a pair of annular ridges 5d on the inner face of each of the followers separated sufficiently to receive the T heads 7a of the bolts and in this instance the bolts are provided with nuts 8 engaging the exterior faces of the end flanges 3 of the sleeve 2. I have also shown in Figures 4, 5, 6, the follower sections provided with overlapping end portions 5c, in which case the bolt holes are so arranged that one of them extends through each of the overlapping portions of the follower sections and positively unites them. This construction, while I may use it in some instances, is not essential and the ends of the follower sections may abut as shown in Figures 1 and 2. With the above mentioned exceptions, the construction and operation of the couplings shown in Figures 4, 5 and 6, is exactly the same as that illustrated in Figures 1, 2 and 3.

In Figure 7, in which parts corresponding with those shown in Figures 1-3, are given the same reference numerals with the addition of 100, I have shown my present invention applied to a bell and spigot joint in which the bell end of a bell and spigot pipe section corresponds substantially with one end of a coupling sleeve. In this figure, 101—101 represent two bell and spigot pipe sections terminating in a plain spigot portion at one end and a bell 102 at the opposite end. The bell is provided with an end flange 103 extending toward the enclosed spigot portion of the adjacent pipe section and providing a pipe aperture 104, the flange 103 has its inner face 103a substantially perpendicular to the axis of the pipes and is provided with a series of bolt holes 103b closely adjacent to the pipe aperture. The bell is provided with an enlarged packing recess 103c which receives a packing ring 106 of the kind illustrated in detail in Figure 3, and a sectional follower 105, constructed substantially as shown in Figures 1 and 2, and having threaded apertures therein. A series of cap screws 107, are passed through the registering apertures of the end flange 103, packing ring 106, and the threaded apertures in the follower, as shown in Figure 7. The cap screws are shown as drawn up and the packing ring compressed in Figure 7, but it will be understood that the parts are assembled in the condition illustrated at the right in Figure 1 before the joint is made and the pipe sections may be shipped with the bell ends supplied with the coupling means shown, that is to say, the packing ring, follower, and clamping means, with the packing ring in the uncompressed condition with its inner face in substantial alinement with the pipe aperture of the flange 103, so as to permit the spigot end of an adjoining pipe to be slipped into the bell after which the cap screws are screwed up and the packing ring placed under compression to form a tight joint in the manner previously described and as illustrated in Figure 7. It will be noted that the internal pressure of the line will be transmitted in this case also to the packing ring 106, through the follower 105. Obviously, bolts and nuts may be used in place of cap screws if desired.

Figure 8, in which the parts corresponding with those shown in Figures 1-3, are given the same reference numerals with the addition of 200, illustrates a slight modification of my improved coupling shown in Figures 1-8, in which it is possible and commercially practicable to use integral followers. In this figure, the sleeve 202, which is preferably formed of wrought metal, is originally made with its ends outwardly flared as indicated at 202a in dotted lines in Figure 8, and the interior of the sleeve is provided at each end with a pair of spaced annular ribs indicated at 202b and 202c, which however have their inner curved surfaces of much greater diameter than the exterior diameter of the pipe sections 201. With this arrangement, I provide at each end of the sleeve a pair of integral rings or followers 203 and 205, having their central apertures only slightly less than the interior diameter of the end portions of the sleeve after they have been swaged, rolled, or otherwise pressed into the positions indicated in full lines in Figure 8. The integral rings 203 and 205, are provided with registering bolt holes indicated at 203b and 205b, which are engaged in this instance by bolts 207 passing through registering apertures in the packing rings 206, which are interposed between the metal rings 205 and 203, and are of the same construction shown in detail in Figure 3. The bolts 207 are held from rotation in any preferred manner. In the present instance, I have shown headless bolts, the inner ends of which are welded to the rings 205 as indicated at 205e, but they may be provided in any other manner with means for preventing them from turning in respect to the rings 205. The outer ends of the bolts are provided with nuts 208.

In assembling the parts of this coupling, which is done at the factory, the rings 203, 205, are placed on opposite sides of a packing ring 206 of the form shown in detail in Figure 3, the bolts 207 being passed through the packing ring and the bolt apertures in the ring 203, in each set, and the nuts 208, are partly screwed on without, however, exerting material pressure on the opposite convex faces of the packing ring. The several rings, packings, bolts and nuts, as units, are then inserted into the flared ends of the sleeve 202 until the ring 203 is within the inner face of the end flange 202b. This position will be best indicated in making the assembly by inserting the rings and packing units until the inner ring 205 engages the annular rib 205c of the sleeve 202, as will be readily seen from an examination of Figure 8. The flared end portions 202a of the sleeve 202, are then upset so as to bring them into a position substantially parallel with the axis of the sleeve as indicated in the full lines in Figure 8 when the short flange 202b will lie alongside of the integral ring 203 and form therewith an annular member, the inner edge of which constitutes a pipe aperture, as in the forms previously described. This completes the coupling assembly by bringing the exterior flanges 202b of the sleeve inward, so that they overlap somewhat the outer faces of the rings 203, and as these rings are preferably integral, the parts cannot thereafter become separated.

The upsetting of the end portions of the sleeve may be accomplished by a circular series of hydraulic rams such as is used in tire setting machines, for example, or it may be accomplished by a roller press or in any other desired manner. There are certain advantages of this form of coupling in the manufacture of the same since the packing units, each comprising the rings 203, 205, packing ring 206, nuts and bolts, can be assembled in large quantities, inserted first in one end and then the other end of the sleeve 202, and secured in place by upsetting the sleeve, thus uniting all parts of the coupling permanently for transportation and use in the field. In operation, this form of my invention will follow that previously described with reference to Figures 1–3. The packing rings are shown in the uncompressed condition. The tightening of the nuts 208, will clamp the rings 203 and 205 upon the convex faces of the packing rings in the manner previously described, and force the inner face of each packing ring into packing engagement with the exterior surface of the enclosed pipe section before the convex faces of the packing rings are flattened out. In the form of coupling shown in Figure 8, it will also be noted that the internal pressure in the line will be transmitted to the packing rings 206 through the metal rings 205, as in the construction illustrated in Figures 1–7. Obviously, I may use cap screws in place of the bolts and nuts by providing the inner follower rings 205 with threaded apertures.

In Figure 9, in which parts corresponding with those in Figures 1–3 are given the same reference numerals with the addition of 300, I have shown another slight modification of my invention in the form of a coupling for plain end pipes, the packing rings being shown in compressed condition. In this construction, 302, represents the sleeve provided with inwardly extending flanges 303, the inner circular edges of which form the pipe apertures 304 of the sleeve. In this form, I have shown the flanges 303 set in a distance from the outer ends of the sleeve, thereby providing the packing recesses on the outer faces of the said flanges. In conjunction with each flange 303, and on the outer face thereof is provided a packing ring 306 constructed as shown in detail in Figure 3 on the outer face of which is the follower 305, which may either be an integral follower or it may be formed in segments as preferred and as illustrated in Figures 1 and 2. Cap screws 307, extend through registering apertures in the follower 305, packing ring 306, and flange 303, at each end of the sleeve. In this instance, I have shown the apertures in the flanges 303 as being threaded, to receive the cap screws 307. I may use bolts and nuts and provide any suitable means for preventing the rotation of the bolts when the nuts are being turned. As is clearly obvious from Figure 9, the coupling therein shown can be completely assembled at the factory, the cap screws 307 being only turned up far enough to secure the parts together against accidental disengagement. It will be understood that in this form of the coupling also the inner faces of the packing rings will be of sufficient diameter to slip over the exterior surfaces of meeting plain pipe ends after which the cap screws (or bolts and nuts) will be screwed up to first bring the inner faces of the packing rings into sealing engagement with the pipes by exerting pressure on the opposite convex faces of the packing rings, and being further turned up to make a satisfactory sealing joint as the other portions of the convex faces of the packing rings are brought into contact respectively with the exterior faces of the flanges 303, and the inner faces of the followers 305. While the form of my invention illustrated in Figure 9 is entirely practicable and usable, it is not my preferred form as the internal pressure of the line is not transferred to the packing but is received by the inner faces of the flanges 303 of the sleeve 302.

In Figures 10 and 11 in which the parts corresponding with those in Figures 1, 2 and 3, are given the same reference numerals with the addition of 400, I have shown my invention embodied in a repair sleeve for leaky joint. In these figures, 402 represent the sections of a repair sleeve adapted to enclose in this instance a pipe joint of the screw collar type. The sleeve sections are provided with side packings represented at 402a, and are united by said clamping bolts 402b and end clamping bolts 402c provided with appropriate nuts for drawing the sections together upon the side packings. The sleeve is provided at each end with an inwardly extending flange 403 providing a pipe aperture 404, and having a series of apertures 403. 405 represent the followers which are preferably formed in sections as in Figures 1 and 2, for example, and they are provided with threaded apertures to register with the apertures 403b. 406 represent the packing rings and as these sleeves are usually placed in position around the pipe line already laid, the packing rings will preferably be formed in two halves with overlapping ends, as indicated at 406x. The side packings are so arranged that their opposite ends will come into sealing contact with the outer faces of the packing ring, as shown in Figure 10. The packing rings 406 will otherwise be formed as shown in detail in Figure 3. 407 represent cap screws which extend through the registering apertures of the flange 403, packing ring 406 at each end of the sleeve, and are screwed into the threaded apertures of the followers 405. In the case of a split sleeve, it will only be necessary to disassemble the sleeve sections by the removal of the side bolts 402b and end bolts 402c, in order to place the sleeve around a joint in a line already laid, after which the parts are again assembled and the bolts 402b and 402c tightened up, after which all of the cap screws can be tightened to compress the packing, in the manner hereinbefore described. Obviously, the line of separation of the followers indicated at 405x will correspond with the line of separation of the sleeve segments and the lapping (or abutting) portions of the packing rings 406x will be so arranged as to permit the packing rings to be placed around the pipe sections when the sleeve sections and corresponding sections of the followers are detached.

In the following claims where I have used the word "rubber", it is to be understood that this term includes either rubber or any rubber composition suitable for use in pipe couplings for the attainment of a gas tight joint.

It will also be understood, where I have referred to the sleeve member being provided with an inwardly extending annular flange terminating at its inner edge in a pipe aperture, this is equally definitive of a construction like that shown in Figure 1, in which the entire flange is integral with the sleeve and extends to the pipe aperture and the construction illustrated in Figure 8, in which the integral portion of the flange extends toward the pipe aperture and is supplemented by a separate annular ring as 205, confined by the integral portion of the flange and forming in effect a part of the integral portion of the flange.

Where in the following claims I have referred to clamping bolts, for effecting the compression of the packing rings, it is to be understood that this will include screws such as cap screws, engaging threaded apertures in the follower or sleeve flange, as well as bolts passing entirely through the connected parts and engaging suitable nuts.

What I claim is:

1. In a pipe coupling, the combination of a sleeve member, having adjacent to a terminal portion thereof a pair of integral inwardly extending flanges, a packing ring, a pair of metal rings on opposite sides of the packing ring and disconnected from said flanges, said rings being provided with registering bolt holes, a series of bolts extending through said metal rings and packing rings, said metal rings and packing ring being located in the terminal portion of said sleeve member between said integral inwardly extending annular flanges thereof and held in position thereby, the inner peripheral portions of said metal rings and packing ring forming a pipe opening to receive the plain end of a pipe section.

2. In a pipe coupling, the combination of a sleeve, provided adjacent to each end with longitudinally separated inwardly extending annular flanges, each end of said sleeve being provided with a pair of metal rings located between said flanges and having their inner surfaces of less diameter than said flanges, and forming a pipe aperture and a packing ring between said metal rings, said packing ring having cylindrical inner and outer peripheral surfaces of substantially equal length in a direction parallel with the axis of the packing ring and connected by opposite convex lateral surfaces, and said metal rings having the faces adjacent to the packing ring plane and substantially perpendicular to the axis of the sleeve, said metal rings and packing ring having registering apertures and clamping bolts extending through the registering apertures in said metal rings and packing ring at each end of the sleeve, and provided on the outer face of the outermost metal ring with clamping nuts, and means for preventing the bolts from turning with respect to the parts through which they extend.

3. In a pipe coupling, the combination of a sleeve member, a pair of metal rings, a packing ring located therebetween and having cylindrical inner and outer peripheral surfaces of substantially equal length in a direction parallel with the axis of the packing ring and connected by opposite convex lateral surfaces, the inner peripheral surfaces of said metal rings and packing ring forming a pipe aperture, clamping bolts extending through registering apertures in said metal rings and packing ring, said metal rings and packing ring being inserted within and held against longitudinal movement with respect to said sleeve member by integral inwardly extending flanges on said sleeve member.

4. In a pipe coupling, the combination of a sleeve member, having adjacent to its outer end an inwardly extending annular flange member terminating at its inner edge in a pipe aperture and providing a packing recess on one face of said flange, a rubber packing ring located in said recess and having cylindrical inner and outer peripheral surfaces of substantially equal length in a direction parallel with the axis of the packing ring and connected by opposite convex lateral surfaces, a metal follower located on the opposite side of said packing ring, the faces of said follower and flange adjacent to the packing ring being plane and substantially perpendicular to the axis of the sleeve member, and clamping bolts extending through registering apertures in said follower, packing ring, and flange, for holding said parts in assembled relation prior to use, and for forcing the inner surface of said packing ring into sealing engagement with a plain end pipe section, in use.

5. In a pipe coupling, the combination of a sleeve, provided adjacent to each end with an inwardly extending flange, disposed substantially perpendicularly to the axis of the sleeve and terminating at its inner surface in a pipe aperture, a packing recess being formed at each end of said sleeve at one side of the adjacent flange, a packing ring in each of said packing recesses, each packing ring having cylindrical inner and outer peripheral surfaces of substantially equal length in a direction parallel with the axis of the packing ring and connected by opposite convex lateral surfaces, a metal follower in each of said recesses for compressing the packing ring between it and the adjacent flange, a series of clamping bolts at each end of said sleeve extending through registering apertures in one of said flanges, and the adjacent packing ring and follower for holding the parts in assembled relation prior to use, and for clamping said packing rings to bring them into sealing engagement with a pipe section when in use.

6. In a pipe coupling, the combination of a sleeve provided with opposed annular clamping elements provided with plane opposed surfaces and having their internal diameters forming pipe apertures to loosely receive a pipe section, and held against accidental removal from the sleeve, an annular rubber gasket having cylindrical inner and outer peripheral surfaces of substantially equal length in a direction parallel with the axis of the gasket, and connected by opposite convex lateral surfaces, and threaded clamping devices extending through apertures in said clamping elements and gaskets to hold the parts of the coupling in assembled relation prior to the insertion of a pipe member, whereby the tightening of said clamping elements upon said gasket will force its inner periphery into sealing engagement with the pipe and the lateral faces of the gasket into contact with substantially the entire plane opposed faces of the clamping elements and set up such internal stress within the gasket as will tend to to prevent exudation thereof.

7. In a pipe coupling the combination of a sleeve provided with opposed annular clamping elements provided with plane opposed surfaces and having their internal diameters forming pipe apertures to loosely receive a pipe section, and held against accidental removal from the sleeve, an annular rubber gasket having cylindrical inner and outer peripheral surfaces of substantially equal length in a direction parallel with the axis of the gasket, and connected by opposite convex lateral surfaces, the internal diameter of said gasket being sufficiently greater than the external diameter of a pipe section to be connected with said sleeve to enable such pipe section to be readily inserted in the coupling when the parts thereof are in assembled relation, and threaded clamping devices extending through apertures in said clamping elements and gasket to hold the parts of the coupling in assembled relation prior to the insertion of a pipe member, whereby the tightening of said clamping elements upon said gasket will force its inner periphery into sealing engagement with the pipe and the lateral faces of the gasket into contact with substantially the entire plane opposed faces of the clamping elements and set up such internal stress within the gasket as will tend to prevent exudation thereof.

8. In a pipe coupling, the combination of a sleeve provided at each end with a pair of annular clamping elements having opposed plane faces, one of said elements of each pair being integral with the sleeve, said elements having their interior diameters of a size to loosely engage the pipe sections to be connected, an annular gasket located between each pair of clamping elements, and provided with cylindrical exterior and interior peripheral faces, of substantially equal length, in a direction parallel to the axes of the gaskets, and connected by oppositely convex side walls, the internal diameters of said gaskets being greater than the external diameters of the pipe sections, and threaded clamping devices at each end of the sleeve extending through registering apertures in the clamping elements and interposed gasket, and holding the parts in assembled relation with respect to the sleeve, whereby the pipe sections can be inserted into the assembled coupling, and the tightening of said clamping elements will force the inner peripheral surfaces of the gaskets into sealing engagement with the pipe sections and the lateral faces of the gaskets into contact with substantially the entire opposed faces of the clamping elements and set up internal stress within the gasket, tending to prevent the extrusion thereof.

JOHN A. CURTIS.